United States Patent
Trigiani

[19]

[11] Patent Number: 5,826,636
[45] Date of Patent: Oct. 27, 1998

[54] METHOD AND APPARATUS FOR CHARGING PRESSURIZED SYSTEMS

[76] Inventor: Phil Trigiani, 4280 Claypine Rise, Mississauga, Ontario, Canada, L4W 2G3

[21] Appl. No.: 710,486

[22] Filed: Sep. 18, 1996

[51] Int. Cl.⁶ .................................... B65B 3/04
[52] U.S. Cl. ................ 141/382; 141/3; 141/18; 141/383; 62/292; 62/293; 222/391; 222/327
[58] Field of Search ................. 141/2–4, 18, 20, 141/382, 383; 222/327, 391; 62/292, 293

[56] References Cited

U.S. PATENT DOCUMENTS

| | | | |
|---|---|---|---|
| 1,604,392 | 10/1926 | Davis | 141/382 |
| 1,672,421 | 6/1928 | Negley | 222/391 |
| 2,083,035 | 6/1937 | Rogers | 141/383 |
| 2,367,347 | 1/1945 | Good | 222/391 |
| 2,634,889 | 4/1953 | Sherbondy | 222/391 |
| 2,768,768 | 10/1956 | Cornell et al. | 222/391 |
| 2,776,075 | 1/1957 | Etter | 222/391 |
| 2,899,085 | 6/1959 | Collins | 222/391 |
| 3,430,819 | 3/1969 | Moonan | 141/3 X |
| 3,795,262 | 3/1974 | Post | 141/382 |
| 3,797,534 | 3/1974 | Skidmore | 141/3 |
| 4,467,620 | 8/1984 | Bradley et al. | 62/292 |
| 4,999,976 | 3/1991 | Smith | 141/3 X |
| 5,027,605 | 7/1991 | Hardesty | 62/292 |
| 5,297,399 | 3/1994 | Tieken | 62/292 |
| 5,377,724 | 1/1995 | Ray | 141/20 |
| 5,535,790 | 7/1996 | Hirz | 141/20 |
| 5,555,740 | 9/1996 | Stevenson | 62/293 |
| 5,638,997 | 6/1997 | Hawkines et al. | 222/391 |

*Primary Examiner*—J. Casimer Jacyna
*Attorney, Agent, or Firm*—Michael I. Kroll

[57] ABSTRACT

The present invention relates to a method and apparatus for charging a closed, pressurizable fluid system with an appropriate fluid, comprising a) connecting to the system a closed, unpressurized container containing a predetermined amount of the fluid, b) mechanically forcing the contents out of the container into the system being recharged, and c) disconnecting the container. Preferably, the container is a cylindrical cartridge having a piston sealably disposed therein to displace the cartridge contents. The method and apparatus are effective in recharging various pressurized systems and fluids, such as air conditioning and refrigeration coolant lines, dye injectors, oils, chemicals, glue and the like.

2 Claims, 2 Drawing Sheets

METHOD AND APPARATUS FOR CHARGING PRESSURIZED SYSTEMS

BACKGROUND OF THE INVENTION

1. Field of the Invention

The present invention relates to the field of pressurized fluid systems. More specifically, the present invention is concerned with a method and apparatus for charging a pressurized fluid system with an appropriate fluid. Even more specifically, the present invention is concerned with the use of non-pressurized cartridges in a dispensing gun for introducing the cartridge contents into a pressurized fluid system.

2. Description of the Prior Art

Pressurized fluid systems are very common in industrialized society. The fluid can be gaseous, for example, air conditioning coolant, nitrogen, argon and the like; liquid, for example, hydraulic fluid, oil, aqueous and non-aqueous solutions, and the like; viscous, for example, glue; and non-viscous. All such systems are similar, however, in that they are all pressurizable, closed systems. As such, these systems generally operate optimally within a certain pressure range. If the internal pressure falls below this range, the system needs to be "recharged" with the appropriate fluid.

Some systems contain a combination of fluids. For example, air conditioning and refrigeration systems generally contain a refrigerant (the primary fluid) in combination with a lubricating oil (the secondary fluid) for the compressor and other critical components. The lubricating oil is generally present in fairly low quantities, usually less than 5% of the total fluid. The present invention provides for the introduction of these secondary fluids into systems charged with the primary fluids.

Some systems, for example, air conditioning/refrigeration coolant lines, are designed to remain closed during use; theoretically, these systems should not require recharging because they should not lose or consume their contents. In practice, however, the internal pressure inside such systems tends to drop over time, due to leakage, however minor, or degradation/decomposition of the pressurized material. Accordingly, these systems commonly require periodical recharging.

With regard to known charging methods, the particular method chosen varies with the application. For example, gaseous systems such as those described above are generally charged by means of a container which is at a pressure higher than that of the system being charged. The charging container is connected to the system being charged, essentially forming a combined, closed system, and the connection between the two systems is opened, usually by a valve. Because the charging container has a higher partial pressure than the system being charged, opening the connection will cause the combined system to move toward equilibrium, that is, a final pressure intermediate the two initial system pressures. When the pressure of the system being charged reaches an appropriate level, or the combined system reaches equilibrium, the connecting valve is closed and the charging container is disconnected. With this method of charging, is it essential that the pressure of the charging container be higher than that of the system being charged. The use of non-pressurized charging containers would avoid the expense, inconvenience and safety concerns associated with highly pressurized containers, and would consequently represent a significant improvement in the art.

For more viscous materials, rather than using the above-described method of charging in which the system remains closed and pressurized, it is more common to 1) open the system, thereby depressurizing it; 2) add additional material; 3) close the system; and 4) repressurize the system. This method can be readily employed when the charging fluid is, for example, a non-volatile liquid, for example, hydraulic fluid. Unlike gaseous systems, when these systems are opened, the enclosed material can be retained without pressurization. With this method, both the charging container and the system being charged are generally at ambient pressure.

Highly viscous materials, for example, glue or caulking, are most commonly applied in an open, non-pressurized environment. The general concept of dispensing a fluid from a chamber by means of dispensing gun apparatus has been known for many years and has been effectively embodied in a wide variety of dispensing guns for dispensing various types of materials, most commonly viscous fluids and pastes. A typical example is standard caulking gun, which utilizes a disposable cartridge filled with a non-pressurized viscous fluid. These guns generally include squeezable handle and trigger assemblies which, when operated, utilize their mechanical advantage to insert a piston into the cartridge, thereby forcing the contents out through a reduced diameter dispensing nozzle.

SUMMARY OF THE INVENTION

The present invention is concerned with a method and apparatus for charging a pressurized, closed system in need of charging, by means of a non-pressurized, closed charging cartridge. The method comprises 1) connecting the charging cartridge to the system being charged to form a combined, closed system; 2) mechanically forcing the contents of the charging cartridge into the system being charged; and 3) disconnecting the charging cartridge from the system being charged.

An object of the present invention is therefore a method and apparatus for charging a closed, pressurized fluid system with a closed, non-pressurized cartridge containing a suitable fluid.

A further object of the invention concerns a method for charging a pressurized fluid system by connecting the system with a non-pressurized charging cartridge, thereby forming a combined closed pressurized system, followed by mechanically forcing the contents of the charging cartridge into the system being recharged.

A still further object of the invention is to provide a method and apparatus for charging a pressurized fluid system by mechanically driving a piston through a charging cartridge, thereby forcing the contents of the cartridge into the system being charged.

It is a further object to provide a method and apparatus for charging a pressurized fluid system with a non-pressurized charging cartridge which can be either refillable or disposable.

It is another object of the invention to provide a method and apparatus for charging a pressurized fluid system from a non-pressurized charging cartridge with a predetermined amount of fluid.

It is yet a further object of the invention to provide a method and apparatus for charging a pressurized air conditioning/refrigeration line with a lubricant and/or dye from a closed, non-pressurized charging cartridge containing a predetermined amount of such lubricant and/or dye.

Further objects of the invention will become apparent from the following description and examples.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

Figure 1:
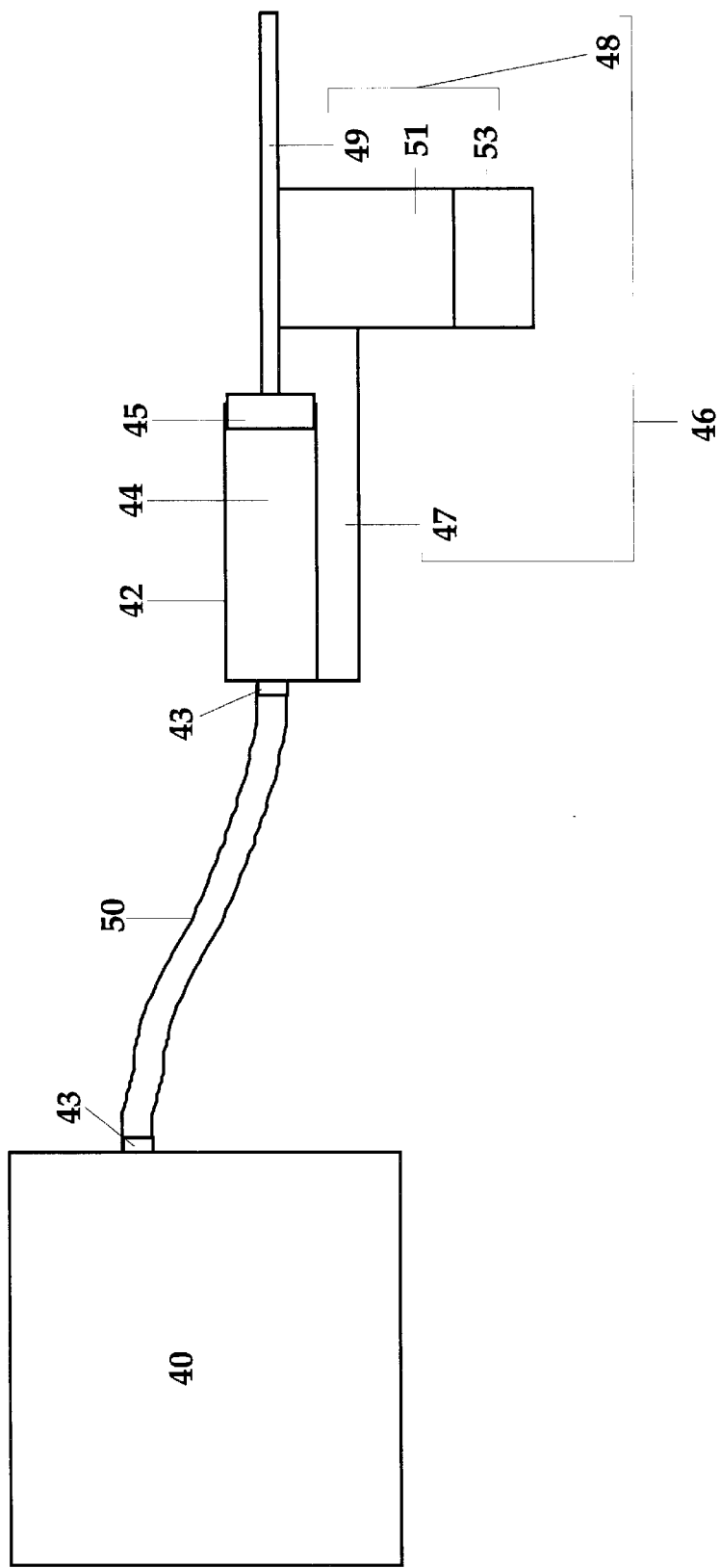
FIG. 1 is a diagrammatic view of the basic elements of the method of the present invention.
Figure 2:
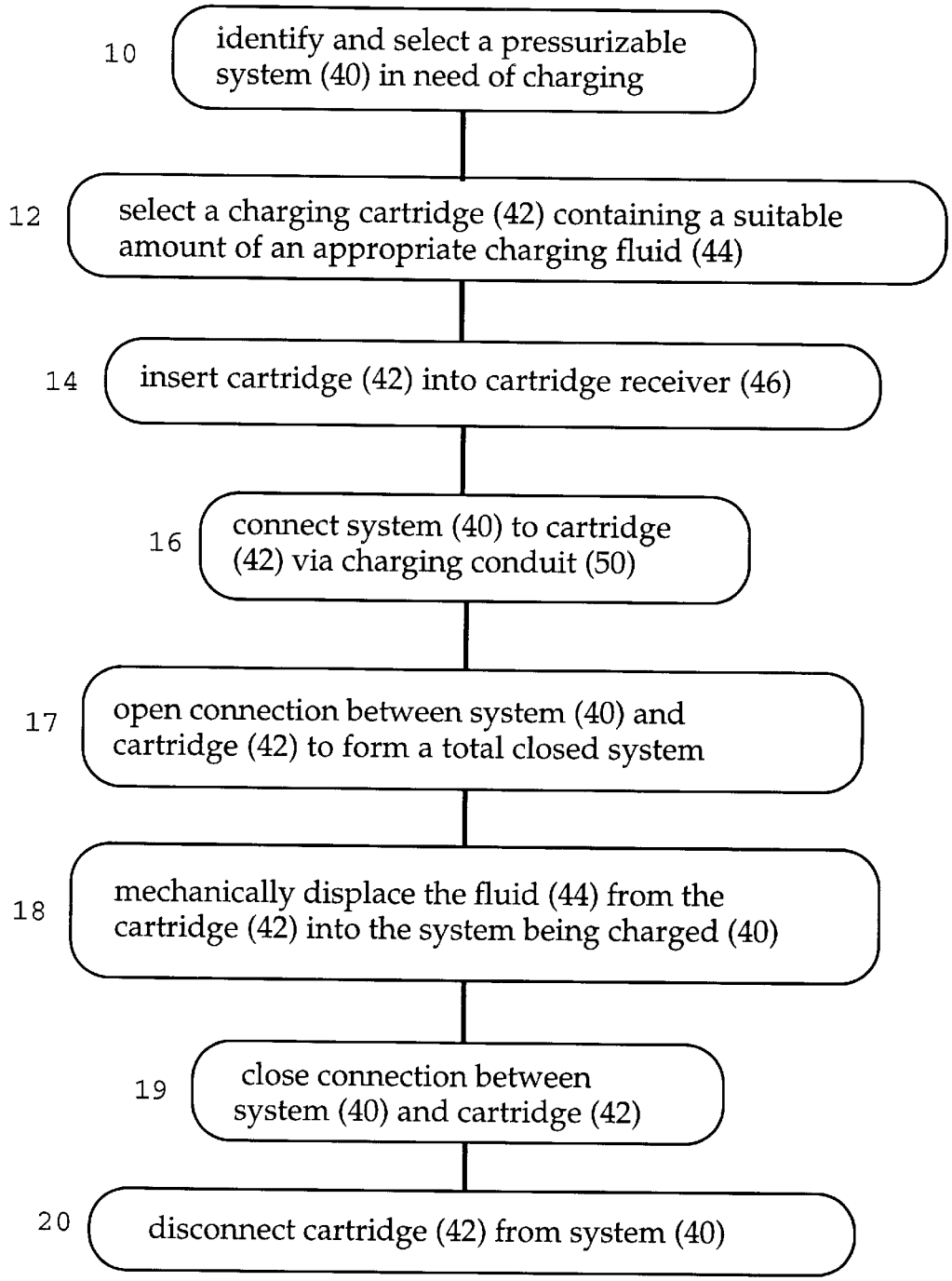
FIG. 2 is flow diagram of the method of the present invention showing separate steps for opening and closing the connection between the charging cartridge and the system being charged.

10—Initially, a pressurized system in need of charging (40) is identified and selected for charging.
12—After the system to be charged (40) is selected, a charging cartridge (42) is selected which contains an appropriate amount of an appropriate charging fluid (44) at about ambient pressure.
14—The cartridge (42) is then inserted into a cartridge receiver (46) having mechanical means (48) for displacing the charging fluid (44) from the cartridge (42) into the system to be charged (40).
16—The cartridge (42) and the system being charged (40) are then connected to each other by a suitably adapted charging conduit (50).
17—After the cartridge (42) and the system being charged (40) are connected to each other by the charging conduit (50), the connection is opened, thus creating, in effect, a single, combined, closed, pressurized system.
18—The mechanical means (48) is employed, thus displacing the charging fluid (44) from the cartridge (42) into the system being charged (40).
19—The reverse of reference no. 17, above. After the contents (44) of the cartridge (42) are forced into the system being charged (40), the connection between the system being charged (40) and the cartridge (42) is closed.
20—The reverse of reference no. 16, above. The charging conduit (50) is disconnected from the system being charged (40).
40—Pressurized system in need of charging.
42—Charging cartridge. This is filled, at about ambient pressure, with a preselected quantity of charging fluid (44).
43—releasable connection
44—Charging fluid. This is the fluid to be introduced into the pressurized system (40).
45—piston
46—Cartridge receiver. This component is adapted to releasably engage the cartridge (42) and contains mechanical means for displacing the charging fluid (44) from the cartridge (42).
47—cartridge gripping means
48—Mechanical means for displacing the charging fluid (44) from the cartridge (42).
49—piston driving rod
50—Charging conduit. This component is essentially a conduit adapted at one end to securely and releasably engage the cartridge (42) and at the other end to securely and releasably engage the system being charged (40), effectively combining these two items into a single, closed system (52).
51—double pawl mechanism
52—Combined closed system which results from connecting the cartridge (42) to the system being charged (40) with the charging conduit (50).
53—squeezable handle

DETAILED DESCRIPTION OF THE PREFERRED EMBODIMENT

In the foregoing definitions the term "fluid" is meant to include gases and liquids. "Unpressurized" or "non-pressurized" means at or about ambient (atmospheric) pressure. A "system in need of charging" refers both to systems which are underpressurized and to those which are already pressurized with a primary fluid but which require the introduction of a secondary fluid. Examples include air conditioning and refrigeration systems which are fully charged with refrigerant but which require the addition of a secondary fluid such as lubricating oil and/or dye.

The present invention concerns a novel method and apparatus for charging a closed, pressurizable fluid system with an appropriate fluid from an unpressurized container. The novel method comprises a) sealably and releasably connecting to a system in need of charging, a closed, unpressurized container containing a predetermined amount of the appropriate fluid, so that the system and the container combine to form a single closed binary system, b) mechanically forcing the contents out of the container into the system being charged, and c) disconnecting the container from the system.

Preferably, the container is a cylindrical cartridge having two ends, a first open end which connects to the system being charged, and a second open end having a piston sealably disposed therein. Once the cartridge is connected to the system being charged, sliding the piston down the length of the cartridge will displace its contents, forcing them out the first open end and into the system being charged. During this step, the cartridge and its connections will be put under pressure greater than or equal to that of the system being charged. Accordingly, fittings and materials must be chosen with this in mind. In most applications, simple screw-on fittings will suffice, with O-rings effective in sealing connections, particularly with the piston/cartridge wall interface. It has been found that, using standard fittings and connections, including a plurality of O-rings received within circumferentially oriented grooves on the exterior surface of the piston, the method and apparatus of the present invention is readily adaptable for use in systems within a pressure range of from about –30 to about 300 psi (pounds per square inch).

With regard to the cartridge, it is preferred that it be received within a cartridge receiver having cartridge gripping means and piston driving means. The fluid in the cartridge is mechanically forced out of the cartridge via displacement by the piston, which, in turn, is driven down the cartridge by a piston driving means. The exact nature of the piston driving means is not critical, as long as it develops sufficient mechanical advantage to drive the piston down the cartridge against the pressure of the system. Typical examples include the aforementioned squeezable handle and trigger assemblies, commonly used on such devices as caulking guns. For example, the piston driving means could include a) a squeezable handle assembly, b) a ratcheted piston driving rod, and c) a double pawl mechanism functionally coupling the handle assembly with the driving rod so that squeezing the handle drives the rod into the piston and down the length of the cartridge, thus displacing its contents.

With regard to the charging cartridges, such cartridges can be either single-use (disposable) or refillable.

It is anticipated that, in general usage, the method and apparatus of the present invention will further include a charging conduit having two ends, a first end sealably secured to the first open end of the cartridge, and a second end sealably connected to the system being charged. Such a removable conduit would allow a standard size cartridge to be used to refill a great variety of pressurized systems. All one would need would be an adaptor fitting allowing the conduit to connect with the system being recharged.

It will be understood that each of the elements described above, or two or more together, may also find a useful application in other types of applications differing from the type described above.

While the invention has been illustrated and described as embodied in a method and apparatus for charging pressurized systems, it is not intended to be limited to the details shown, since it will be understood that various omissions, modifications, substitutions and changes in the forms and details of the formulation illustrated and in its operation can be made by those skilled in the art without departing in any way from the spirit of the present invention.

Without further analysis, the foregoing will so fully reveal the gist of the present invention that others can, by applying current knowledge, readily adapt it for various application without omitting features that, from the standpoint of prior art, fairly constitute essential characteristics of this invention.

What is claimed as new and desired to be protected by Letters Patent is set forth in the appended claims:

1. A method of charging a closed, pressurizable fluid system with a fluid dye comprising the steps:
   a) sealably and releasably connecting to said system a closed, unpressurized container containing a predetermined amount of said dye, said system and said container combining to form a closed binary system, said container being a cylindrical cartridge received within a cartridge receiver having cartridge gripping means and piston driving means, said cartridge having two ends, a first open end which connects to said system, and a second open end having a piston sealably disposed therein, said system and said container being sealably and releasably connected by a charging conduit having two ends, a first end sealably secured to said first open end of said cartridge, and a second end sealably connected to said system;
   b) mechanically forcing said dye out of said container into said fluid system via displacement by said piston being driven down the cartridge by said piston driving means, said piston driving means comprising:
      i) a squeezable handle assembly;
      ii) a ratcheted piston driving rod; and
      iii) a double pawl mechanism functionally coupling said handle assembly with said driving rod so that squeezing said handle drives the rod into said piston and down the length of said cartridge; and
   c) disconnecting said container from said system.

2. An apparatus for charging a closed, pressurizable fluid system with an appropriate fluid dye comprising:
   a) a closed, unpressurized container containing a predetermined amount of said fluid dye, said container adapted to sealably and releasably connect to said system to form a closed binary system, said container being a cylindrical cartridge received within a cartridge receiver having cartridge gripping means and piston driving means, said cartridge having two ends, a first open end which connects to said system, and a second open end having a piston sealably disposed therein, said system and said container being sealably and releasably connected by a charging conduit having two ends, a first end sealably secured to said first open end of said cartridge, and a second end sealably connected to said system; and
   b) means for mechanically forcing said fluid dye out of said container into said fluid system via displacement by said piston being driven down the cartridge by said piston driving means, said piston driving means comprising:
      i) a squeezable handle assembly;
      ii) a ratcheted piston driving rod; and
      iii) a double pawl mechanism functionally coupling said handle assembly with said driving rod so that squeezing said handle drives the rod into said piston and down the length of said cartridge.

* * * * *